United States Patent [19]
Coombs et al.

[11] Patent Number: 5,200,736
[45] Date of Patent: Apr. 6, 1993

[54] ASSEMBLY FOR MONITORING HELMET THERMAL CONDITIONS

[75] Inventors: Christopher E. Coombs, Boonton, N.J.; Gene Keohane, Philadelphia, Pa.; Robert M. Armstrong, Clifton Heights, Pa.; Robert E. Gray, Glen Mills, Pa.

[73] Assignee: Cairns & Brother Inc., Clifton, N.J.

[21] Appl. No.: 763,190

[22] Filed: Sep. 20, 1991

Related U.S. Application Data

[63] Continuation-in-part of Ser. No. 691,682, Apr. 25, 1991, abandoned, which is a continuation of Ser. No. 436,257, Nov. 13, 1989, abandoned.

[51] Int. Cl.$^5$ .................... G08B 17/00; A42B 3/00
[52] U.S. Cl. .............................. 340/586; 2/5; 340/573; 340/691
[58] Field of Search ........... 340/586, 573, 590, 691; 2/5, 7, 8

[56]  References Cited
U.S. PATENT DOCUMENTS

| | | | |
|---|---|---|---|
| 3,201,771 | 8/1965 | Proulx | 340/586 |
| 4,196,429 | 4/1980 | Davis | 340/573 X |
| 4,468,656 | 8/1984 | Clifford et al. | 340/573 X |
| 4,567,474 | 1/1986 | Wolin | 340/586 X |
| 4,648,131 | 3/1987 | Kawaguchi et al. | 340/573 X |
| 4,719,462 | 1/1988 | Hawkins | 342/20 |
| 4,814,766 | 3/1989 | Dominque | 340/590 |
| 4,914,422 | 4/1990 | Rosenfield et al. | 340/573 |
| 5,023,597 | 6/1991 | Salisbury | 340/573 X |

Primary Examiner—Thomas Mullen
Attorney, Agent, or Firm—R. Gale Rhodes, Jr.

[57] ABSTRACT

An assembly is disposed on a helmet for monitoring predetermined thresholds of ambient thermal condition of the helmet. Such assembly includes at least one thermistor for sensing the status of an ambient thermal condition and a signal comparator for detecting each predetermined threshold. Individual LED's visually indicate when each predetermined threshold is reached, while an audible alarm indicates when a hazardous predetermined threshold is reached. The audible alarm is further utilized to indicate if the battery voltage is under a predetermined threshold which is predicated on the breakdown voltage of a reference diode when a test switch is closed. A temperature responsive switch is also included to conserve the life of the battery by activating and deactivating the assembly about a predetermined temperature level.

35 Claims, 3 Drawing Sheets

ASSEMBLY FOR MONITORING HELMET THERMAL CONDITIONS

CROSS-REFERENCE TO RELATED APPLICATIONS

This application is a continuation-in-part of pending U.S. patent application Ser. No. 07/691,682, now abandoned filed Apr. 25, 1991, in the names of Christopher E. Coombs, Gene Keohane, Robert M. Armstrong and Robert E. Gray, entitled ASSEMBLY FOR MONITORING THERMAL CONDITIONS WITHIN A HELMET, and assigned to the same assignee as this application, which application is a continuation of abandoned U.S. patent application Ser. No. 07/436,257, now abandoned filed Nov. 13, 1989, in the names of Christopher E. Coombs, Gene Keohane, Robert M. Armstrong and Robert E. Gray, entitled ASSEMBLY FOR MONITORING THERMAL CONDITIONS WITHIN A HELMET and assigned to the same assignee as this application.

BACKGROUND OF THE INVENTION

(1) Field of the Invention

This invention relates generally to helmets for use in high temperature environments, and more particularly to the monitoring of hazardous ambient thermal conditions of such helmets. The expression "ambient thermal condition of a helmet" as used in the context of the present invention, the present specification and the appended claims, is used to define the thermal condition within the helmet and the thermal condition immediately adjacent the exterior of the helmet, such as the thermal condition immediately adjacent the exterior surface of the helmet and the thermal condition immediately adjacent a face shield or facepiece mounted pivotally to the top front portion of the helmet.

(2) Description of the Prior Art

Most helmets are worn to protect the head from impact forces which may be encountered in many different types of activity, including activities which are performed in high temperature environments. Firefighting is one such activity in which a very severe high temperature environment is encountered. Although firefighting assembly is available for monitoring an accumulative thermal condition and time of exposure thereto, this accumulative thermal condition does not necessarily relate directly to the ambient thermal conditions of the helmet which are encountered within helmets and immediately adjacent the exterior of the helmets that are worn during firefighting activities.

To greatly reduce the weight of helmets, reinforced plastic is commonly utilized as the material in the impact protecting shell portion of most helmets. Since the integrity of plastic deteriorates at elevated temperatures, a need exists for the ambient thermal condition of the helmet shell to be monitored directly. Furthermore, high temperature buildup within a helmet diminishes alertness and can even cause unconsciousness, so that a need also exists for the temperature buildup within helmets to be monitored directly. Of course, such thermal monitoring needs exist not only for helmets worn in firefighting but also for helmets worn in other activities, such as those of workers in a steel mill, and similar monitoring needs where surrounding environment temperature would be excessive.

OBJECTS OF THE PRESENT INVENTION

An object of the present invention is to provide an assembly for directly monitoring ambient thermal conditions of a helmet.

Another object of the present invention is to provide an assembly in accordance with the above stated general object, wherein predetermined threshold levels of the thermal conditions are visibly and/or audibly indicated.

Still another object of the present invention is to provide an assembly in accordance with the above stated general object, wherein the life of a battery is prolonged by automatically activating and deactivating such assembly about a predetermined helmet related temperature level.

A still further object of the present invention is to provide an assembly in accordance with the above stated general object, wherein test provisions are included for assuring that the voltage level of the battery is above a predetermined level.

SUMMARY OF THE INVENTION

These and other objects of the invention are accomplished by an assembly including at least one temperature sensor disposed immediately adjacent a helmet for monitoring ambient thermal conditions of the helmet. Individual signal comparators may be included to detect each predetermined threshold of the thermal conditions, while a light emitting diode to visibly indicate the attainment of each predetermined threshold is located on the helmet in the field of view of the user therefrom, and a Piezo alarm may be included to audibly indicate the attainment of a critical predetermined threshold and/or the under voltage test level of a battery for operating the assembly. An automatic activating and deactivating feature may be accomplished with a temperature responsive switch, while a battery test feature may be initiated through another switch and the predetermined under voltage test level thereof is derived with a reference diode.

BRIEF DESCRIPTION OF THE DRAWINGS

The scope of the present invention is only limited by the appended claims for such support is predicated on the preferred embodiments hereinafter set forth in the following description and the attached drawings wherein like reference characters relate to like parts throughout the several figures.

DETAILED DESCRIPTION OF THE INVENTION

Figure 1:
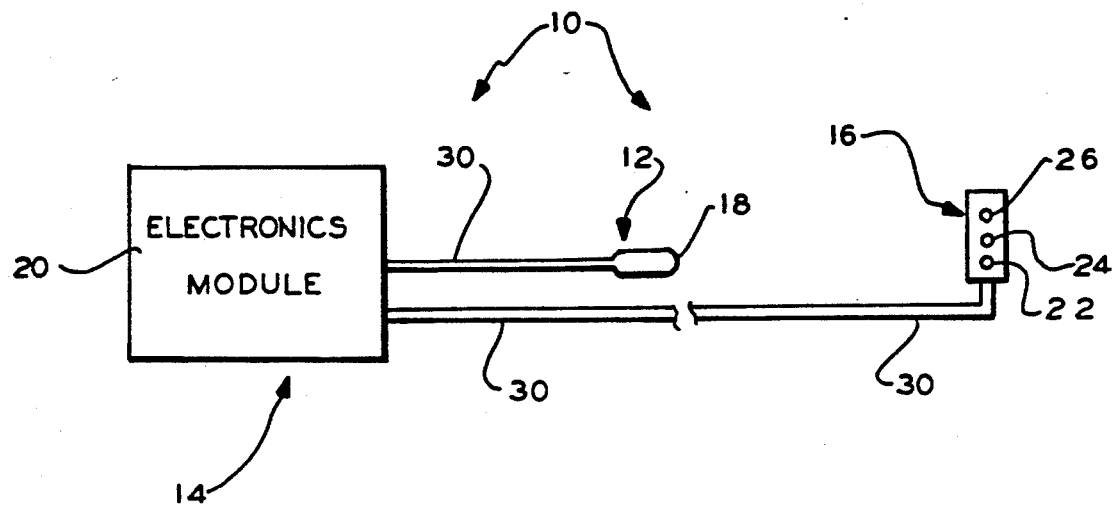
FIG. 1 is a layout for the distribution of the major components in the preferred embodiments of the invention.

The present invention relates to a battery operated assembly 10 for monitoring at least one predetermined threshold of an ambient thermal condition of a helmet worn by a user of the helmet. Referring to FIG. 1, the assembly 10 is comprised of means 12 for sensing the status of at least one thermal condition, means 14 for detecting when the status of the thermal condition reaches each predetermined threshold, and means 16 for indicating when each predetermined threshold is reached. At least one thermistor 18 is utilized as the sensing means 12 in all of the embodiments disclosed herein. However, such embodiments could be modified to utilize any other device capable of sensing the status of thermal conditions. Circuitry contained by an electronics module 20 is utilized as the detecting means 14 in all of the preferred embodiments disclosed herein and a schematic for this circuitry is provided in FIG. 3. Visible indicators, such as light emitting diodes (hereinafter LED's) 22, 24, 26 are utilized as indicating means 16 in the preferred embodiments disclosed herein. However, as shown only in the schematic of FIG. 3, an audible alarm 28 or buzzer could also be utilized as the indicating means 16. Furthermore, the electronics module 20 is electrically interconnected to the thermistors 18 and the LED's 22, 24, 26 through wires in an insulated cable 30.

Figure 2:
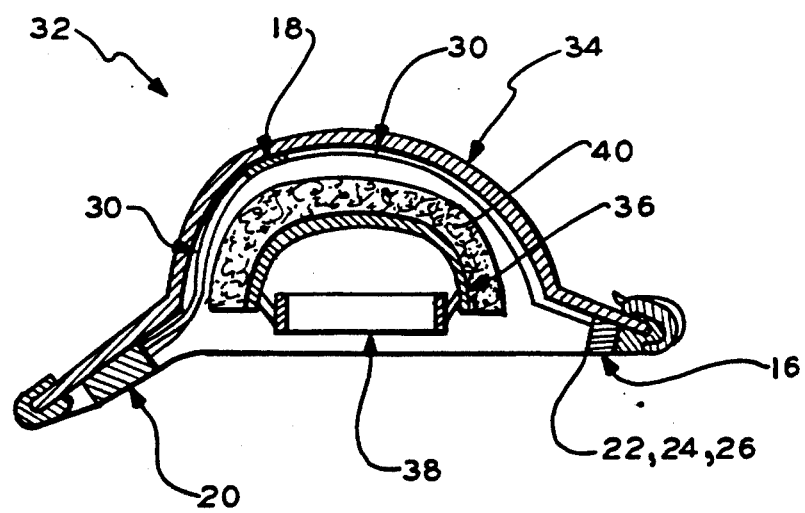
FIG. 2 is a cross-sectional view of one type of firefighting helmet in which locations are suggested for the components shown in FIG. 1.

A helmet 32 referring to FIG. 2 is illustrated with assembly 10 of FIG. 1 disposed therein. Although helmet 32 could be of any type, a common firefighter's helmet is shown which includes an impact protection shell 34 that is held in position on the head by a cap liner 36 having a head band 38 and shock absorbing material 40 affixed thereto. One thermistor 18 is secured on the interior surface of the shell 34 to sense the ambient thermal condition of the helmet, in this embodiment the temperature within the helmet 32, however, a plurality of thermistors 18 could be disposed within the helmet 32, depending on the thermal condition to be monitored. An example of a thermal condition requiring more than one thermistor 18 is heat flow through the shell 34, which of course would require a thermistor 18 on each side of the shell 34. Electronics module 20 is disposed interiorly on the back brim of the shell 34 and is electrically interconnected through the cable 30 to both the thermistor 18 and the LED's 22, 24, 26 which are disposed interiorly on the front brim at a location in the field of view from the helmet 32. The circuitry of the detecting means 14 within the electronics module 20 may be contained on either a printed or integrated circuit board (not shown).

Figure 3:
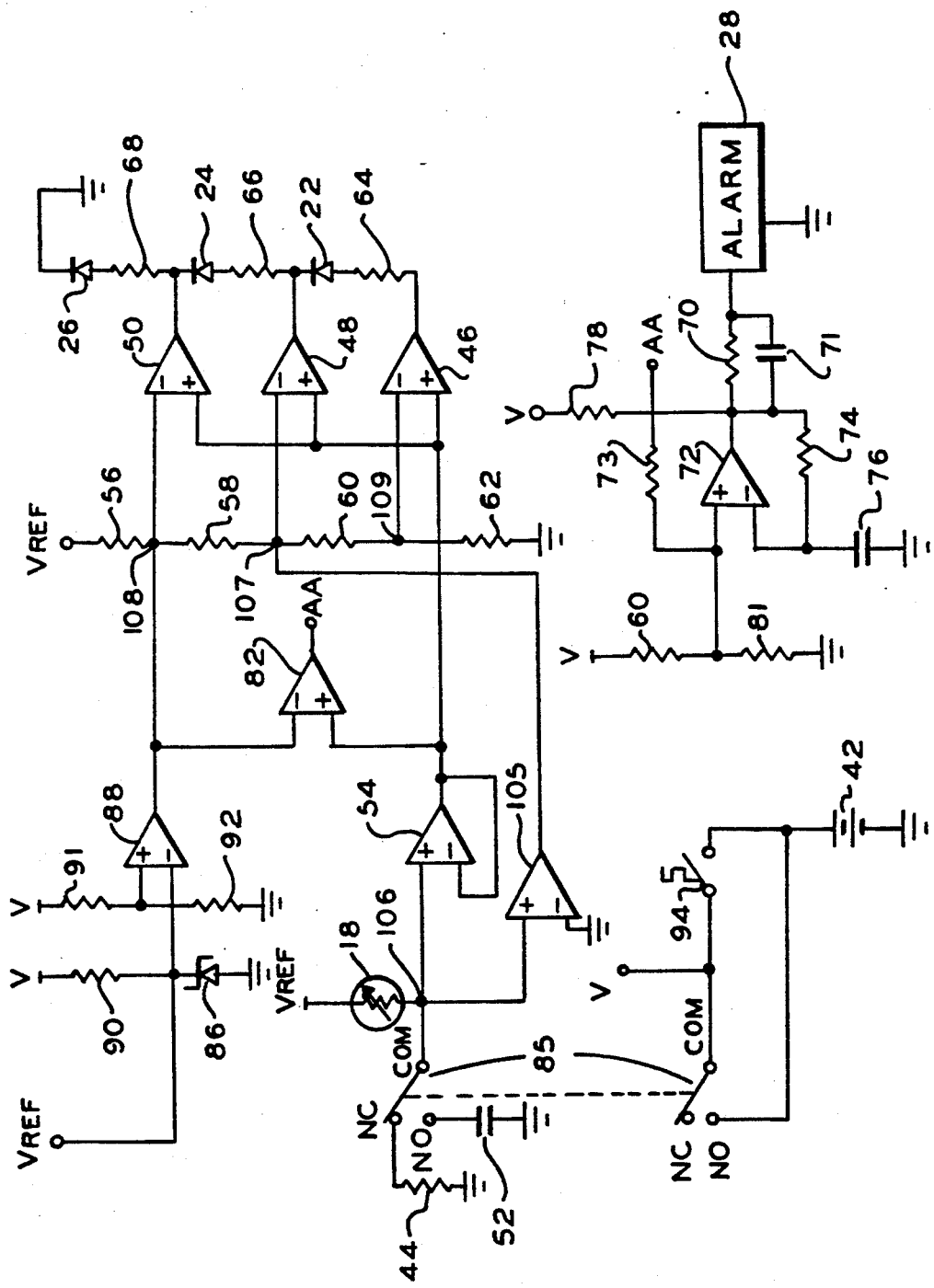
FIG. 3 is a schematic diagram for the circuitry utilized the preferred embodiments of the invention.

FIG. 3 illustrates only one of the circuit implementations which are possible for the assembly 10 of the invention. This circuit implementation includes several operational amplifiers which are conventionally arranged as signal comparators. Each such signal comparator includes an input terminal at the non-inverting input of its operational amplifier, a threshold set terminal at the inverting input of its operational amplifier and an output terminal at the output of its operational amplifier. Each signal comparator functions to produce a high level signal at its output terminal when the voltage level at its input terminal equals or exceeds the voltage level at its threshold set terminal.

A battery 42 is disposed within the module 20 and supplies its voltage V to the circuit implementation of FIG. 3 through a voltage divider having the thermistor 18 series connected with a resistor 44 to ground. The status of the thermal condition is therefore continuously available as the voltage level (hereinafter referred to as thermistor signal) at the node between the thermistor 18 and the resistor 44. (This thermistor signal is applied to the input terminal of one signal comparator for each predetermined threshold detected in regard to the thermal condition.)

For purposes of discussion only, three predetermined thresholds of the thermal condition have been selected for detection by the assembly 10 and consequently, three comparators 46, 48, 50 are included therein for this purpose. The thermistor signal is linearized within the range of temperature thresholds by resistor 44 and buffer 54. A voltage level in accordance with the predetermined threshold to be detected thereby, is applied to the threshold set terminal of each comparator 46, 48, 50. These voltage levels may be derived in any conventional way, such as with a voltage divider having V applied through series connected resistors 56, 58, 60, 62 to ground. The nodes between the successive resistors 56, 58, 60, 62 are individually connected to the threshold set terminals of the comparators 46, 48, 50 respectively. LED's 22, 24, 26 are individually connected to the output terminals of the comparators 46, 48, 50 respectively, through separate current limiting resistors 64, 66, 68. These limiting resistor/LED combinations are connected in series to ground.

As the temperature of the shell 34 increases, the resistance of the thermistor 18 decreases to increase the voltage level of the thermistor signal at the intput terminals of the comparators 46, 48, 50. When the magnitude of the thermistor signal reaches the voltage level at the threshold set terminal of comparator 46, the output terminal thereof applies its high level signal to turn on LED 22 and thereby indicate that the thermal condition has reached its first predetermined threshold. As the magnitude of the thermistor signal continues to increase, it reaches the voltage level at the threshold set terminal of comparator 48 which then applies its high level signal from the output terminal thereof to turn on LED 24 and thereby indicate that the thermal condition has reached its second predetermined threshold. When the magnitude of the thermistor signal ultimately reaches the voltage level at the threshold set terminal of comparator 50, the output terminal thereof applies its high level signal to turn on LED 26 and thereby indicate that the thermal condition has reached its third predetermined threshold. The high level signals from the output terminals of comparators 46, 48, 50 are substantially the same voltage level and therefore, LED 22 turns off when LED 24 turns on and LED 24 turns off when LED 26 turns on, because a voltage drop can only occur across one LED at any time in this arrangement.

In most embodiments of the invention the final predetermined threshold represents a critical status of the thermal condition, such as the high temperature of the shell 34 has rendered it soft and ineffective for providing protection against impact forces. Furthermore, the deterioration status of the thermal condition can be indicated by using LED's of different colors, such as with a green LED 22, a yellow LED 24, and a red LED 26. Also, when the thermal condition reaches its critical or final predetermined threshold, the audible alarm 28 or buzzer may be sounded.

Alarm 28 could be actuated through any of several well-known circuits. To have greater effect however, alarms are often actuated intermittently and in FIG. 3, the alarm 28 is so actuated through a resistor 70 and capacitor 71 by the output of an operational amplifier 72 in a relaxation oscillator arrangement. Separate feedback resistors 73 and 74 are connected from the output of operational amplifier 72 to each of its inverting and non-inverting inputs, while its inverting input is also grounded through a capacitor 76. V is applied to the output of operational amplifier 72 through a resistor 78 and also to the non-inverting input thereof through a voltage divider comprised of resistors 80 and 81.

An alarm trigger signal is applied at node AA to initially raise the voltage level at the non-inverting input of operational amplifier 72 above the voltage level at the inverting input thereof, and thereby generates a high voltage level at the output of the operational amplifier 72, to actuate the alarm 28. However, capacitor 76 immediately starts to raise the inverting input of operational amplifier 72 to this same voltage level and causes the alarm 28 to be deactuated when that level is reached. But then the alarm trigger signal immediately raises the voltage level on the non-inverting input of operational amplifier 72 above the voltage level on the inverting input thereof and the alarm actuation cycle is repeated. Of course, this cycle repeats continuously until the alarm trigger signal is discontinued.

The alarm trigger signal is generated whenever the status of the thermal condition reaches its final or critical predetermined threshold. Although many conventional circuits could be utilized to generate the alarm trigger signal, another signal comparator 82 is utilized for this purpose in FIG. 3. The third and final predetermined threshold of the thermal condition status is applied from the threshold set terminal of comparator 50, to the threshold set terminal of comparator 82. The thermistor signal is applied at the input terminal of comparator 82 in the same manner as it is applied at the input terminals of comparators 46, 48, 50. Consequently, when the voltage level of the thermistor signal causes the voltage level at the input terminal of comparator 50 to exceed the voltage level at the threshold set terminal thereof, LED 26 turns on concurrently with the alarm trigger signal being generated from the output terminal of comparator 82 at node AA.

Certainly, the output voltage level of the battery 42 must be maintained above a predetermined threshold for the thermal condition monitoring assembly 10 of this invention to function reliably. Although other means are available for assuring the integrity of the battery 42, audible alarm 28 is further utilized in FIG. 3 to indicate when the voltage level of the battery 42 is under a predetermined threshold. For this indication, alarm 28 is also actuated by the output of operational amplifier 72 in the relaxation oscillator arrangement, when a battery alarm signal is applied thereto from the comparator 82.

To generate the battery alarm signal, a double pole, double throw test switch 85 is incorporated, which when closed generally applies V to the assembly 10 through one pole thereof.

The second pole of the test switch 85 alternates between resistor 44 and capacitor 52. In test mode, the input to buffer 54 is connected to capacitor 52 which gradually increases through all the present thresholds thereof to thereby apply V directly to the input terminal of comparator 82. Otherwise, the voltage level at the threshold set terminal of comparator 82 is controlled by the breakdown voltage level of a reference diode 86. This breakdown voltage level is applied to the threshold set terminal of a signal comparator 88 which has its output terminal connected to the threshold set terminal of comparator 82. V is applied to backbias the reference diode 86 through a current limiting resistor 90 and also across a voltage divider having a single node between resistors 91 and 92. The voltage level of this single node is applied at the input terminal of comparator 88, and resistors 91, 92 are sized to drop this voltage level below the breakdown voltage level of the reference diode 86 when V falls below its predetermined threshold of reliable operation.

Until this drop occurs, the voltage level at the output terminal of comparator 88 assures that the voltage level at the threshold set terminal of comparator 82 remains higher than the voltage level at the input terminal thereof and therefore, no battery alarm signal is generated. After this drop does occur however, the voltage levels at the output terminal of comparator 88 and at the threshold set terminal of comparator 82 both fall below the voltage level at the input terminal of comparator 82. Of course, the battery alarm signal will then be generated at the output of comparator 82, so long as the test switch 85 is closed.

A temperature responsive switch 94 may be incorporated into the assembly 10 of the invention, to conserve the life of the battery 42 when the status of the terminal condition is much below its first predetermined threshold. For example, until the temperature of the shell 34 in the FIG. 2 embodiments of the invention reaches 120° F., the capability of the shell 34 to withstand impact forces is beyond question. In a firefighting environment, however, the temperature of the shell 34 can rise very quickly from 120° F. level and therefore, the switch 94 could be selected to activate the circuitry of FIG. 3 at that temperature level. Switch 94 is connected to activate the circuitry of FIG. 3 by closing when the temperature thereof rises to some predetermined level and to deactivate that circuitry by opening when the temperature thereof falls below that predetermined level.

Figure 4:
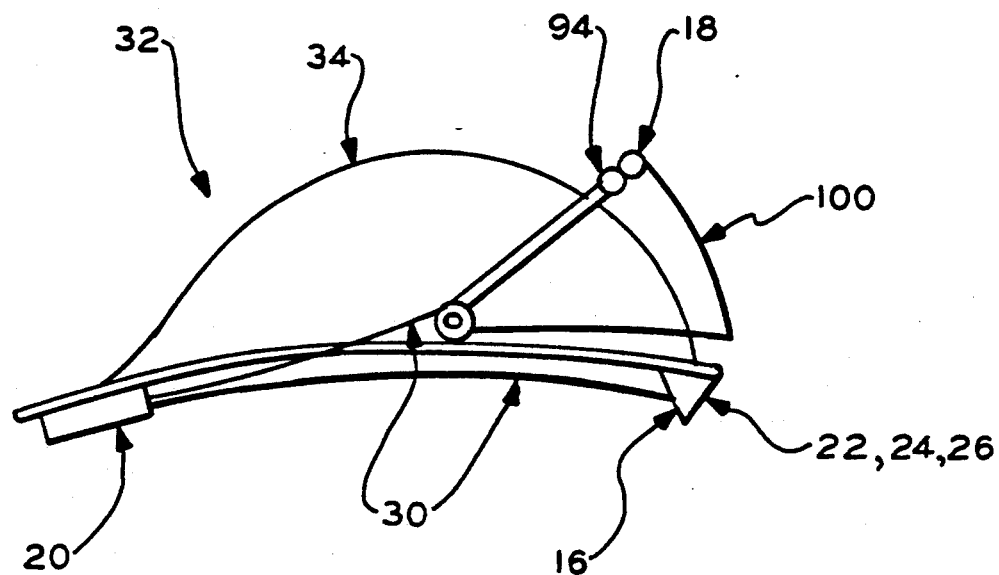
FIGS. 4 and 5 are side elevational views of alternate embodiments of the present invention.
Figure 5:
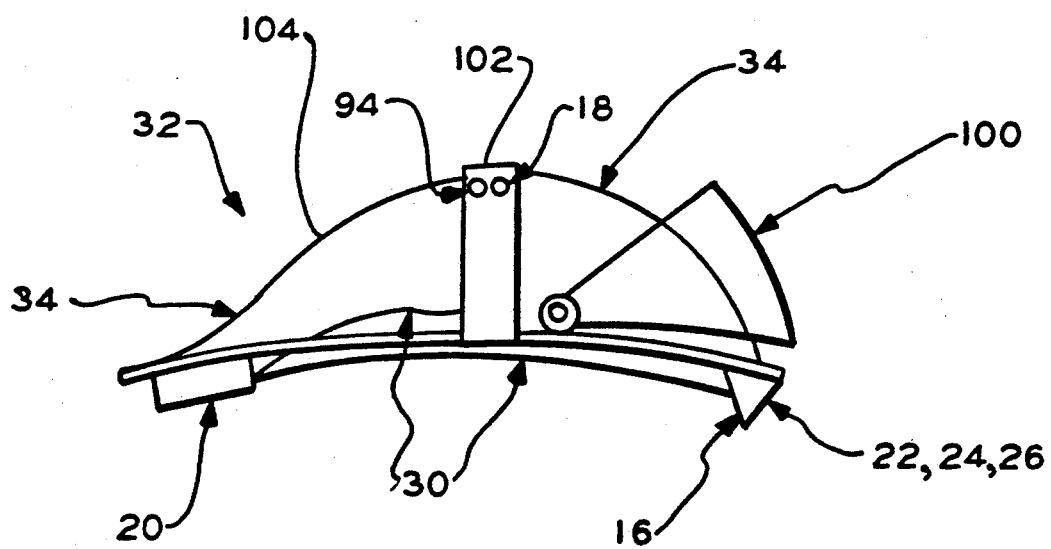

Referring now to FIGS. 4 and 5, it will be understood that the elements in these figures which are the same as the elements in FIGS. 1, 2 and 3 are given the same reference numerals and function and operate in the same manner as described above particularly with regard to FIG. 3. Accordingly, it will be understood that in the alternate embodiment of FIG. 5 the thermistor 18 is provided at the top portion of a substantially transparent face shield or facepiece 100 mounted pivotally, as shown, at the top front portion of the helmet 32. In this embodiment, the temperature responsive switch 94 of FIG. 3 is also mounted at the top portion of the face shield or facepiece 100.

In the alternate embodiment of FIG. 5, it will be understood that the thermistor 18 and thermal responsive switch 94 may be suitably mounted on a band 102 made of suitable material and which band is suitably secured to the outer surface 104 of the impact protecton shell 34 of the helmet 32, such as for example by a suitable adhesive.

It will be understood, and referring again to FIGS. 4 and 5, that in FIG. 4 the ambient thermal condition of the helmet 32 is monitored or sensed by the thermistor 18 being mounted on the top portion of the face shield 100 to sense or monitor the thermal condition immediately adjacent the top portion of the face shield or facepiece 100. In the embodiment of FIG. 6, it will be understood that the thermistor 18 monitors or senses an ambient thermal condition of the helmet 32 by monitoring or sensing the ambient thermal condition immediately adjacent the exterior surface 104 of the impact protection shell 34 of the helmet 32.

Referring again to FIG. 3, and in particular to the operational amplifier 105 whose non-inverting input is connected to the node 106 in series with the thermistor 18 and the reference voltage V, and which operational amplifier 105 has its output, for example, and as illustrated in FIG. 3, connected to the node 107 of the voltage divider network comprising the resistors 56, 58, 60 and 62, upon the thermistor 18 operating in its normal condition a continuous electric circuit condition is present therethrough and the non-inverting input of the operational amplifier 105 receives sufficient voltage that it is turned on, but the output of the operational amplifier 105 applied to the node 107 in the on state is insufficient to disturb the normal operation of the voltage divider network, resistors 56, 58, 60 and 62. However, upon the thermistor 18 for example becoming broken, burned out, or otherwise inoperative to cause an open electrical circuit condition therethrough, the reference voltage V applied to the thermistor 18 in FIG. 3 is removed from the non-inverting input of the operational amplifier 105 and the operational amplifier 105 turns off, sufficiently, to apply a sufficiently negative voltage to the node 107 and to the inverting input of the comparator 48 to operate the comparator 48 to apply a sufficiently high level signal to the LED 24 to turn on the LED 24 and give a visual indication to the wearer or user of the helmet 32, FIGS. 2, 4 or 5, that the thermistor 18, or temperature sensing probe, is not functioning and that the breathing gas pressure monitoring system is inoperable. Alternatively, if it is desired to use the LED 26 or 22 to provide a visual indication to the wearer or user of the helmet 32, FIGS. 2, 4 or 5, that the thermistor, or temperature sensing probe, 18 is not functioning and that the breathing gas pressure monitoring system is not operable, the output of the operational amplifier 105 is applied to the node 108 or the node 109.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A battery operated assembly for monitoring at least one predetermined threshold of a thermal condition within a helmet of a user, comprising:
    means disposed in said helmet for sensing said thermal condition;
    means disposed in said helmet for detecting when said thermal condition reaches said predetermined threshold; and
    means disposed in said helmet in the field of view of said user for visually indicating to said user when said predetermined threshold is reached.

2. The assembly as defined in claim 1 wherein said sensing means includes at least one thermistor from which signals relating to the status of the thermal condition are derived.

3. The assembly as defined in claim 2 wherein the helmet includes an impact protection shell and said thermistors are securable in contact therewith.

4. The assembly as defined in claim 1 wherein said detecting means includes an individual signal comparator for deriving each predetermined threshold, each said comparator generating a high level signal at an output terminal thereof when the voltage level at an input terminal thereof equals or exceeds the voltage level at a threshold set terminal thereof.

5. The assembly as defined in claim 4 wherein said detecting means further includes a voltage divider having the individual nodes thereof respectively connected to the threshold set terminals of said comparators.

6. The assembly as defined in claim 1 wherein said indicating means includes an individual LED for each predetermined threshold, each said LED being securable on the helmet in the field of view therefrom and being illuminated when the threshold to which it relates is reached.

7. The assembly as defined in claim 6 wherein the illumination from each said LED is of a different color.

8. The assembly as defined in claim 1 wherein an audible alarm is actuated within said indicating means when the thermal condition reaches a critical predetermined threshold.

9. The assembly as defined in claim 8 wherein said audible alarm is actuated intermittently through a relaxation oscillator when an alarm trigger signal is applied to the output of an operational amplifier therein, said operational amplifier having separate feedback resistors connected from its output to its inverting and non-inverting inputs, with its inverting input being grounded through a capacitor, while the battery voltage is applied to its output through a resistor and to its non-inverting input through a voltage divider.

10. The assembly as defined in claim 9 wherein said detecting means includes a comparator for generating said alarm trigger signal at its output terminal, said comparator having a voltage level representation of the thermal condition applied to its input terminal from said sensing means and a voltage level representation of the critical predetermined threshold applied to its threshold set terminal.

11. The assembly as defined in claim 1 wherein an audible alarm indicates when the battery voltage is under a predetermined threshold.

12. The assembly as defined in claim 11 wherein said audible alarm is actuated intermittently through a relaxation oscillator when a battery alarm signal is applied to the output of an operational amplifier therein, said operational amplifier having separate feedback resistors connected from its output to its inverting and non-inverting inputs, with its inverting input being grounded through a capacitor, while the battery voltage is applied to its output through a resistor and to its non-inverting input through a voltage divider.

13. The assembly as defined in claim 12 wherein said detecting means includes a first comparator for generating said battery alarm signal at its output terminal, said first comparator having the battery voltage applied directly to its input terminal and the output terminal of a second comparator connected to its threshold set terminal, the battery voltage threshold being predetermined by said second comparator in accordance with the breakdown voltage of a reference diode.

14. The assembly as defined in claim 13 wherein the battery voltage is applied through a double pole, double throw test switch which closes to generally apply such voltage to said assembly through one pole thereof and also to apply said voltage directly to the input terminal of said first comparator through the other pole thereof.

15. The assembly as defined in claim 13 wherein the battery voltage is further applied to backbias said reference diode through a current limiting resistor and also across a voltage divider having a node at which the voltage level is maintained in direct proportion to the battery voltage, said reference diode having its breakdown voltage applied to the threshold set terminal of said second comparator and said node being connected to the input terminal of said second comparator.

16. The assembly as defined in claim 1 wherein the battery is connected through a single pole, single throw, temperature responsive switch which activates said assembly when the temperature thereof rises above a predetermined level and deactivates said assembly when the temperature thereof falls below that predetermined level.

17. In a helmet of the type for use in activity during which a hazardous thermal condition may be encountered therein, the improvement comprising:
at least one thermistor for sensing the status of the thermal condition;
at least one signal comparator for detecting when the status of the thermal condition reaches a predetermined threshold, each said comparator generating a high level voltage at an output terminal thereof when the voltage level at an input terminal thereof exceeds the voltage level at a threshold set terminal thereof;
a voltage divider having the individual nodes thereof respectively connected to the threshold set terminals of said comparators; and
an individual LED for each predetermined threshold, each said LED being disposed on said helmet in the field of view therefrom and being illuminated when the threshold to which it relates is reached.

18. The helmet as defined in claim 17 having an impact protection shell included therein and said thermistors secured in contact with said shell.

19. The helmet as defined in claim 17 wherein the illumination from each said LED is of a different color.

20. The helmet as defined in claim 17 wherein an audible alarm is actuated when the thermal condition reaches a critical predetermined threshold.

21. The helmet as defined in claim 20 wherein said audible alarm is actuated intermittently through a relaxation oscillator when an alarm trigger signal is applied to the output of an operational amplifier therein, said operational amplifier having separate feedback resistors connected from its output to its inverting and non-inverting inputs, with its inverting input being grounded through a capacitor, while a battery voltage is applied to its output through a resistor and to its non-inverting input through a voltage divider.

22. The helmet as defined in claim 21 wherein one of said signal comparators generates said alarm trigger signal at its output terminal, said one comparator having a voltage level representation of the thermal condition applied to its input terminal from said thermistors and a voltage level representation of the critical predetermined threshold applied to its threshold set terminal from one node of said divider.

23. The helmet as defined in claim 17 wherein said helmet further comprises a battery and an audible alarm which indicates when the voltage of said battery is under a predetermined threshold.

24. The helmet as defined in claim 23 wherein said audible alarm is actuated intermittently through a relaxation oscillator when a battery alarm signal is applied to the output of an operational amplifier therein, said operational amplifier having separate feedback resistors connected from its output to its inverting and non-inverting inputs, with its inverting input being grounded through a capacitor, while the battery voltage is applied to its output through a resistor and to its non-inverting input through a voltage divider.

25. The helmet as defined in claim 24 wherein a first of said signal comparators generates said battery alarm signal at its output terminal, said first comparator having the battery voltage applied directly to its input terminal and the output terminal of a second of said comparators connected to its threshold set terminal, the battery voltage threshold being predetermined by said second comparator in accordance with the breakdown voltage of a reference diode.

26. The helmet as defined in claim 25 wherein the battery voltage is applied through a double pole, double throw test switch which closes generally to apply such voltage to the circuitry through one pole thereof and also to apply such voltage directly to the input of said first comparator through the other pole thereof.

27. The helmet as defined in claim 25 wherein the battery voltage is further applied to backbias said reference diode through a current limiting resistor and also across a voltage divider having a node at which the voltage level is maintained in direct proportion to the battery voltage, said reference diode having its breakdown voltage applied to the threshold set terminal of said second comparator and said node being connected to the input terminal of said second comparator.

28. The helmet as defined in claim 17 wherein said helmet further comprises a battery and wherein said battery is connected through a single pole, single throw, temperature responsive switch which activates the circuitry when the temperature thereof rises to a predetermined level and deactivates the circuitry when the temperature thereof falls below that predetermined level.

29. The assembly as defined in claim 1 wherein said assembly is for monitoring a plurality of predetermined thresholds each of a respective thermal condition within said helmet of said user, wherein said sensing means is for sensing each of said respective thermal conditions, wherein said detecting means is for detecting when each of said thermal conditions reaches one of said predetermined thresholds, and wherein said indicating means is for visually indicating to said user when each of said predetermined thresholds is reached.

30. A battery operated assembly for monitoring a plurality of predetermined thresholds each related to a different thermal condition within a helmet of a user, comprising:
sensing means disposed in said helmet for sensing the presence of each of said thermal conditions;
detecting means disposed in said helmet for detecting when each of said thermal conditions reaches one of said predetermined thresholds; and
indicating means disposed on said helmet for indicating to said user when each of said predetermined thresholds is reached.

31. A battery operated assembly for monitoring at least one predetermined threshold of an ambient thermal condition of a helmet of a user, comprising:
sensing means disposed immediately adjacent said helmet for sensing said thermal condition;
detecting means disposed on said helmet for detecting when said thermal condition reaches said predetermined threshold; and
indicating means disposed on said helmet in the field of view of said user for visually indicating to said user when said predetermined threshold is reached.

32. The assembly as defined in claim 31 wherein said helmet has an interior and wherein said sensing means are disposed in said interior of said helmet.

33. The assembly as defined in claim 31 wherein said helmet has an exterior surface and wherein said sensing means are disposed immediately adjacent said exterior surface of said helmet.

34. The assembly as defined in claim 31 wherein said helmet includes a top front portion, wherein a face shield having a top portion is mounted pivotally to said top front portion of said helmet, and wherein said sensing means are disposed on said top portion of said face shield.

35. The assembly as defined in claim 31 wherein said sensing means comprise a thermal sensor which in its normal condition for sensing said thermal condition provides a continuous electrical circuit condition therethrough and which thermal sensor upon being in an abnormal condition is unable to sense said thermal condition and provides an open electrical circuit condition therethrough, and wherein said assembly further includes thermal sensor monitoring means for monitoring the electrical circuit condition of said thermal sensor and for providing an indication to said user upon the presence of said open electrical circuit condition through said thermal sensor.

* * * * *